United States Patent
Palsson

(10) Patent No.: US 9,080,245 B2
(45) Date of Patent: Jul. 14, 2015

(54) CRUST BREAKING DEVICE

(75) Inventor: Peter Palsson, Stockholm (SE)

(73) Assignee: Aventics GmbH, Laatzen (DE)

( * ) Notice: Subject to any disclaimer, the term of this patent is extended or adjusted under 35 U.S.C. 154(b) by 388 days.

(21) Appl. No.: 13/510,741

(22) PCT Filed: Oct. 28, 2010

(86) PCT No.: PCT/EP2010/006606
§ 371 (c)(1),
(2), (4) Date: Aug. 4, 2012

(87) PCT Pub. No.: WO2011/060876
PCT Pub. Date: May 26, 2011

(65) Prior Publication Data
US 2012/0292834 A1    Nov. 22, 2012

(30) Foreign Application Priority Data
Nov. 21, 2009 (DE) .......... 10 2009 052 286

(51) Int. Cl.
*C22B 9/00* (2006.01)
*B22D 41/00* (2006.01)
*C25C 3/14* (2006.01)

(52) U.S. Cl.
CPC ............................. *C25C 3/14* (2013.01)

(58) Field of Classification Search
CPC ........................................ C25C 3/14
USPC ...................... 266/78, 92, 96, 216
See application file for complete search history.

(56) References Cited

U.S. PATENT DOCUMENTS

| 5,914,023 A * | 6/1999 | Roy et al. .............. 205/392 |
| 6,436,270 B1 | 8/2002 | Sander |
| 7,892,319 B2 * | 2/2011 | Massaro et al. .......... 75/684 |

(Continued)

FOREIGN PATENT DOCUMENTS

| DE | 20 2004 008 474 U1 | 9/2004 |
| DE | 10 2004 033 964 B3 | 3/2006 |
| DE | 10 2008 010 175 A1 | 9/2009 |

(Continued)

OTHER PUBLICATIONS

German Search Report corresponding to German Application No. 10 2009 052 286.7, completed Nov. 17, 2010 (4 pages).

(Continued)

*Primary Examiner* — Scott Kastler
(74) *Attorney, Agent, or Firm* — Maginot, Moore & Beck LLP

(57) ABSTRACT

A crust breaking device for metal melts includes a pneumatic cylinder having a cylinder housing, a piston, which is axially displaceable within the cylinder housing, and a piston rod, which is fastened to the piston. The piston rod is guided by the cylinder housing and movable between a retracted final position and an extended final position. The device includes an electronic control unit and a valve arrangement, which can be actuated via the electronic control unit and is connected via control lines to front and rear pressure chambers inside the cylinder housing. The device further includes at least one metal plate that is fixedly arranged within the cylinder housing in order to define a final position of the piston or the piston rod. The metal plate and the piston are electrically connected to the control unit such that a contact of the piston with the metal plate closes a circuit.

8 Claims, 1 Drawing Sheet

(56) References Cited

U.S. PATENT DOCUMENTS

2006/0231385 A1    10/2006    Couvreur et al.
2009/0078110 A1    3/2009    Waldmann et al.

FOREIGN PATENT DOCUMENTS

| | | | |
|---|---|---|---|
| EP | 1 013 943 | A1 | 6/2000 |
| EP | 1 820 974 | A2 | 8/2007 |
| WO | 2008/095510 | A1 | 8/2008 |

OTHER PUBLICATIONS

International Search Report corresponding to PCT Application No. PCT/EP2010/006606, mailed Mar. 18, 2011 (German and English language document) (6 pages).

\* cited by examiner

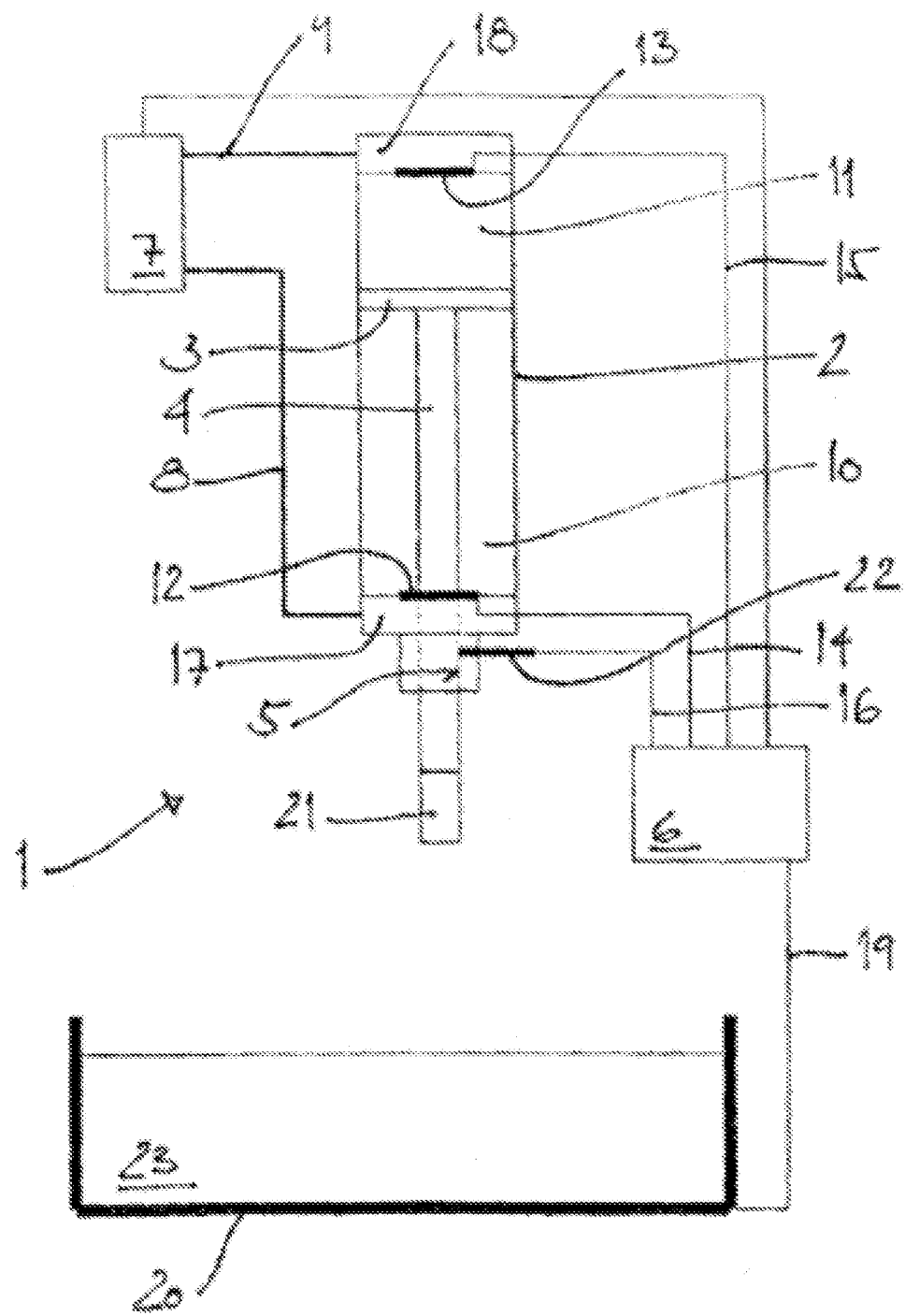

US 9,080,245 B2

CRUST BREAKING DEVICE

This application is a 35 U.S.C. §371 National Stage Application of PCT/EP2010/006606, filed on Oct. 28, 2010, which claims the benefit of priority to Serial No. DE 10 2009 052 286.7, filed on Nov. 21, 2009 in Germany, the disclosures of which are incorporated herein by reference in their entirety.

BACKGROUND

The present disclosure relates to a crust breaking device for metal melts, in particular for aluminum melts, comprising a pneumatic cylinder having a cylinder housing, a piston which is axially displaceable within the cylinder housing, a piston rod, which is fastened to the piston and is guided through an opening at one end of the cylinder housing such that, by axial displacement of the piston, the piston rod is movable between a retracted final position and an extended final position. The device furthermore comprises an electronic control unit and a valve arrangement, which can be actuated by way of the electronic control unit and is connected via working lines to a front pressure chamber and a rear pressure chamber within the cylinder housing.

Crust breaking devices of the type mentioned above are commonly used in the aluminum industry for the production of aluminum. During this process, the aluminum is kept in a heatable container in order to produce a melt. In this process, a crust forms on the surface of the aluminum melt. So that further aluminum and/or additions can be added to the melt, it is necessary from time to time to break the crust. The crust is broken by means of a crust breaking device commonly installed above the container. The crust breaking device comprises a pneumatic cylinder having a piston rod, which is fastened to a piston that is arranged so as to be axially displaceable within the cylinder, in order to move the piston rod between a retracted final position and an extended final position, in which it breaks the crust. In order to make it easier to break the crust, the piston rod may be equipped with a breaking tool, for example a chisel or a pick. Once the crust has been broken, the piston rod returns to its retracted final position.

To actuate the crust breaking device, the rear pressure chamber or the front pressure chamber of the pneumatic cylinder is filled with compressed air by way of a valve arrangement connected to a compressed-air source, while the respective other pressure chamber is vented. The rising pressure in the respective pressure chamber filled with compressed air acts upon the piston, such that the piston is axially displaced. Accordingly, depending on the direction of the axial displacement of the piston, the piston rod is extended or retracted. In order to make it possible to switch over the direction of the axial displacement of the piston once the latter has reached a final position, the valve arrangement is furthermore connected to a control unit, which monitors the position of the piston and actuates the valve arrangement accordingly.

U.S. Pat. No. 6,436,270 discloses a method and a device for controlling the movement of a feeding and breaking chisel in an aluminum production plant, wherein breakage of the crust is detected by means of an AC circuit when the chisel comes into contact with the metal melt. During operation, a high current and a low DC current prevail between a container, which is in the form of a cathode and contains the aluminum melt, and an anode, such that an electrical contact is established between the chisel and the metal melt when the chisel breaks the crust. In this case, the crust acts as an electrical insulator, with electrical contact being prevented until the chisel has reached the melt. Once the electrical contact has been detected, the control unit switches over the supply of compressed air to the cylinder, as a result of which the chisel is withdrawn very quickly from the melt, such that a significant amount of heat is not introduced into the chisel. In this case, harmful heating of the cylinder is reduced to a minimum at the same time, this in turn resulting in lower maintenance and restoration costs. Although the disclosed method and the disclosed device make it possible to determine that the chisel has broken through the crust, they do not make it possible to determine the actual position of the chisel and accordingly of the piston, since the filling level of the melt and/or the thickness of the crust can vary.

Laid-open specification US 2009/0078110 discloses a pneumatic drive system comprising an axially displaceable output drive unit and control valve means, which are equipped with actuating means that are actuated depending on the position of the output drive unit. The actuating means are actuated when the output drive unit has reached a final position or a position just short thereof, with the control valve means being switched into another operating mode. The actuating means assigned to the control valve means are preferably in the form of mechanical response means, which are arranged directly on or in the drive housing. They comprise at least one displaceably mounted plunger member, which protrudes into the path of travel of the output drive unit, such that the output drive unit, upon axial displacement toward a final position, strikes against the response means, with the control valve means being switched. Said document furthermore proposes the use of response means whose actuation does not require physical contact with the output drive unit, for example reed switches or other position sensors. In this case, the control valve means are switched over by using an electric signal. However, the response means disclosed in said document comprise components, for example a displaceably mounted plunger part or electrically actuated sensors, which are susceptible to wear and/or failure, in particular in rough environments, for example the aluminum industry.

It is an object of the present disclosure to provide a crust breaking device of the type mentioned in the introduction which comprises position detection means that are less susceptible to wear and/or failure. The object is achieved by a crust breaking device having the features of the disclosure. Preferred embodiments of the disclosure are described in the claims.

SUMMARY

According to the disclosure, the crust breaking device comprises at least one metal plate, which is arranged fixed in position within the cylinder housing, in order to define a final position of the piston or of the piston rod. The metal plate and the piston are electrically connected to the control unit, such that contact between the piston and the metal plate closes a circuit, which signals to the control unit that the piston or the piston rod has reached the final position. Once the electronic control unit has detected that the piston or the piston rod has adopted the final position, the valve arrangement is preferably switched into another operating mode. If the control unit determines, for example on account of the contact between the piston and a metal plate which delimits the front pressure chamber, that the piston or the piston rod has reached its fully extended position, the valve arrangement is switched into an operating mode in which compressed air is supplied to the front pressure chamber of the cylinder, while the rear pressure chamber is vented. The rising pressure in the front pressure chamber acts upon the piston, such that the piston is axially displaced in the opposite direction, with the piston rod being retracted again. Accordingly, in combination with the piston, the metal plate forms an electrical switch, with the metal plate representing a cost-effective and robust component of such a switch which is outstandingly suitable for use in rough environments, in particular in rough environments at high temperatures. Since the metal plate is arranged fixed in position within the cylinder housing, the electrical switch formed from the metal plate and the piston itself does not comprise any movable components, apart from the piston. Although contact between the piston and the metal plate is required, in order to signal to the control unit that a final position has been reached, the proposed arrangement is extremely reliable and less susceptible to wear.

It is preferable for the crust breaking device to furthermore comprise lines for the direct or indirect electrical connection of the metal plate and of the piston to the control unit and/or for signal transmission.

According to a preferred embodiment of the disclosure, the crust breaking device comprises at least one line for the direct electrical connection of the cylinder housing to the control unit, and in this case ensures the electrical connection of the piston and/or of the piston rod to the control unit. This in turn means that the piston and/or the piston rod are electrically connected to the cylinder housing, for example by physical contact between the piston and/or the piston rod and the cylinder housing. In this specific embodiment, it is possible to dispense with separate lines for the electrical connection of the piston and/or of the piston rod, and therefore assembly of the device is simplified. It is furthermore preferable for the contact between the piston or the piston rod and the cylinder housing to be effected by a sliding contact, which makes it easier for the piston or the piston rod to move in relation to the cylinder housing.

It is furthermore preferable for the metal plate to be electrically insulated from the cylinder housing. The electrical insulation of the metal plate from the cylinder housing ensures that no circuit is closed before the piston makes physical contact with the metal plate.

According to a preferred embodiment of the disclosure, the metal plate is fastened to a housing cover of the cylinder. In order to obtain better lateral support, the metal plate is at least partially inset into the housing cover of the cylinder.

It is preferable for two metal plates to be arranged fixed in position within the cylinder housing, wherein each metal plate defines a final position of the piston or of the piston rod. The axial spacing between the two metal plates thus determines the maximum stroke of the piston. Furthermore, each metal plate is electrically connected to the control unit via at least one separate line. This makes it possible to detect whether the piston has made contact with the metal plate which is fastened to the front housing cover of the cylinder, which means that the piston rod is fully extended, or whether the piston has made contact with the metal plate fastened to the rear housing cover, which in turn signals that the piston rod has reached its retracted final position.

Advantageously, provision is furthermore made of at least one line for electrically connecting the container containing the metal melt to the control unit, such that contact between the piston rod or a tool fastened to the piston rod and the metal melt closes a circuit, which signals to the control unit that the piston rod or the tool has broken the crust of the metal melt. Depending on the respective filling level of the melt and/or the thickness of the crust, the piston rod or the tool fastened to the piston rod is already able to break the crust before it has reached the furthest extended final position. In this case, the piston rod is preferably retracted before the piston has reached its final position and made contact with the metal plate fastened to the front housing cover of the cylinder, since the high temperatures of the melt can damage the piston rod as well as further components of the pneumatic cylinder.

BRIEF DESCRIPTION OF THE DRAWING

A preferred embodiment of the disclosure is described in more detail hereinbelow with reference to the accompanying drawing, labeled FIG. 1.

FIG. 1 shows a schematic longitudinal section through a crust breaking device according to the invention.

DETAILED DESCRIPTION

The crust breaking device shown comprises a pneumatic cylinder 1 having a cylinder housing 2 and a piston 3, which is axially displaceable within the cylinder housing 2. A piston rod 4, which bears a crust breaking tool 21 at the free end thereof, is fastened to the piston 3. The end which bears the tool 21 is guided through an opening 5 in the cylinder housing 2, such that an axial displacement of the piston 3 within the cylinder housing 2 displaces the piston rod 4 and the tool 21 between an extended final position and a retracted final position.

The pneumatic cylinder 1 is installed above a container 20 which contains an aluminum melt. In order to break the crust, which regularly forms on the melt 23, the piston rod 4 is moved downward until the piston rod has reached its extended final position, with the tool 21 breaking the crust.

To actuate the pneumatic cylinder 1, provision is made of a valve arrangement 7, which can be fastened to the cylinder or can be arranged remote from the cylinder. The latter option has the advantage that the amount of heat introduced into the valve arrangement 7 is reduced. The valve arrangement 7 is connected via the working lines 8, 9 to a front pressure chamber 10 and a rear pressure chamber 11 within the cylinder housing 2. In order to axially displace the piston 3, for example in order to extend the piston rod 4, compressed air is supplied to the rear pressure chamber 11 of the cylinder 1 via the valve arrangement 7. In order to retract the piston rod 4 by axial displacement of the piston 3, compressed air is supplied to the front pressure chamber 10 of the cylinder 1 and the rear pressure chamber 11 is vented.

The valve arrangement 7 is actuated by means of an electronic control unit 6, which is preferably likewise arranged remote from the pneumatic cylinder 1 and the container 20, in order to avoid damage to the control unit 6 caused by the high temperatures of the melt 23. Provision is made of at least one line in order to establish a connection between the control unit 6 and the valve arrangement 7. The control unit 6 monitors the position of the piston 3 using two metal plates 12, 13, which are fastened to opposing housing covers 17, 18 of the cylinder housing 2. The spacing between the two metal plates 12, 13 accordingly determines the maximum stroke of the piston 3, since each of the metal plates 12, 13 defines a final position of the piston 3. When it reaches a final position, the piston 3 strikes against one of the two metal plates 12, 13, and in the process closes a circuit, on account of the electrical connection of the two metal plates 12, 13 and of the piston 3 to the control unit 6 via separate lines 14, 15, 16. The circuit signals to the control unit 6 that the piston 3 has reached one of the two final positions, which means that the piston rod 4 is either extended or retracted to the furthest possible extent. Since the signals differ, the control unit 6 is able to determine which specific final position has been reached. Accordingly, the control unit 6 switches the valve arrangement 7, such that compressed air is supplied to a specific working connection, while the other is preferably vented.

The piston rod 3 and the piston rod 4 in the embodiment shown in the single drawing are electrically connected to the control unit 6 indirectly via the cylinder housing 2, with the cylinder housing 2 in turn being electrically connected to the control unit 6 via a line 16. The electrical contact between the piston 3 or the piston rod 4 and the cylinder housing 2 is established by way of a sliding contact 22. In addition, the container 20 which contains the melt 23 is electrically connected to the control unit 6 via a line 19. If the piston rod 4 or the tool 21 fastened to the piston rod 4 breaks the crust on the surface of the melt 23, a further circuit is closed, which signals to the control unit 6 that the crust has been broken. Since the filling level of the melt 23 and/or the thickness of the crust can vary, it may be the case that the crust is already broken before the piston 3 or the piston rod 4 has reached the extended final position. In order to ensure that the high temperatures of the melt 23 do not cause any damage to the piston rod 4 and/or the tool 21, the control unit 6 switches the valve arrangement 7, such that the piston rod 4 and/or the tool 21 are withdrawn quickly from the melt 23, even before the piston 3 has made contact with the metal plate 12 inlet in the front housing cover 17 of the cylinder.

The preferred embodiment described in more detail indicates an example of a crust breaking device according to the disclosure. However, the disclosure is not limited to this specific exemplary embodiment. The advantages described in connection with the specific embodiment are also implemented by modifications of the disclosure.

LIST OF REFERENCE SIGNS

1 Pneumatic cylinder
2 Cylinder housing
3 Piston
4 Piston rod
5 Opening
6 Control unit
7 Valve arrangement
8 Working line
9 Working line
10 Front pressure chamber
11 Rear pressure chamber
12 Metal plate
13 Metal plate
14 Line
15 Line
16 Line
17 Housing cover
18 Housing cover
19 Line
20 Container
21 Tool
22 Sliding contact
23 Melt

The invention claimed is:

1. A crust breaking device for metal melts, comprising:
   a pneumatic cylinder including:
      a cylinder housing,
      a piston which is axially displaceable within the cylinder housing, and
      a piston rod, which is fastened to the piston and is guided through an opening at one end of the cylinder housing such that, by axial displacement of the piston, the piston rod is movable between a retracted final position and an extended final position,
   an electronic control unit,
   a valve arrangement, which can be actuated by way of the electronic control unit and is connected via working lines to a front pressure chamber and a rear pressure chamber within the cylinder housing, and
   a first metal plate, which is fixed within the cylinder housing at a first position and is configured to define a final extended position of the piston or of the piston rod, and
   a second metal plate, which is fixed within the cylinder housing at a second position and is configured to define a final retracted position of the piston or of the piston rod,
   wherein the first metal plate and the piston are electrically connected to the control unit, such that contact between the piston and the first metal plate closes a first circuit, which signals to the control unit that the piston or the piston rod has reached the final extended position, and
   wherein the second metal plate and the piston are electrically connected to the control unit, such that contact between the piston and the second metal plate closes a second circuit, which signals to the control unit that the piston or the piston rod has reached the final retracted position.

2. The device as claimed in claim 1, further comprising lines that are configured to directly or indirectly electrically connect the first metal plate, the second metal plate, and the piston to the control unit and to transmit signals therewith.

3. The device as claimed in claim 1, further comprising at least one line that is configured to directly electrically connect the cylinder housing to the control unit, the electrical connection of the cylinder housing to the control unit simultaneously establishing the electrical connection of one or both of the piston and the piston rod to the control unit.

4. The device as claimed in claim 1, wherein the first metal plate and the second metal plate are is electrically insulated from the cylinder housing.

5. The device as claimed in claim 1, wherein at least one of the first metal plate and the second metal plate is fastened to a housing cover of the cylinder housing.

6. The device as claimed in claim 1, further comprising a container which contains the metal melt and is electrically connected to the control unit via at least one line, such that contact between the piston rod or a tool fastened to the piston rod and the metal melt closes a circuit, which signals to the control unit that the piston rod or the tool has broken the crust of the metal melt.

7. The device as claimed in claim 1, wherein at least one of the first metal plate and the second metal plate is at least partially inset into a housing cover of the cylinder housing.

8. A crust breaking device for metal melts, comprising:
   a pneumatic cylinder including:
      a cylinder housing,
      a piston which is axially displaceable within the cylinder housing, and
      a piston rod, which is fastened to the piston and is guided through an opening at one end of the cylinder housing such that, by axial displacement of the piston, the piston rod is movable between a retracted final position and an extended final position,
   an electronic control unit,
   a valve arrangement, which can be actuated by way of the electronic control unit and is connected via working lines to a front pressure chamber and a rear pressure chamber within the cylinder housing, and
   at least one metal plate, which is fixed within the cylinder housing and is configured to define a final position of the piston or of the piston rod, wherein the metal plate and the piston are electrically connected to the control unit, such that contact between the piston and the metal plate closes a circuit, which signals to the control unit that the piston or the piston rod has reached the final position, and further comprising a container which contains the metal melt and is electrically connected to the control unit via at least one line, such that contact between the piston rod or a tool fastened to the piston rod and the metal melt closes a circuit, which signals to the control unit that the piston rod or the tool has broken the crust of the metal melt.

\* \* \* \* \*